(12) United States Patent
Gegout et al.

(10) Patent No.: US 11,873,121 B2
(45) Date of Patent: Jan. 16, 2024

(54) METHOD FOR ADJUSTING THE ORBITAL PATH OF A SATELLITE

(71) Applicant: AIRBUS DEFENCE AND SPACE SAS, Toulouse (FR)

(72) Inventors: Dorian Gegout, Toulouse (FR); Frédéric Renaud, Toulouse (FR)

(73) Assignee: AIRBUS DEFENCE AND SPACE SAS, Toulouse (FR)

(*) Notice: Subject to any disclaimer, the term of this patent is extended or adjusted under 35 U.S.C. 154(b) by 0 days.

(21) Appl. No.: 17/927,638

(22) PCT Filed: Jun. 10, 2021

(86) PCT No.: PCT/IB2021/055117
§ 371 (c)(1),
(2) Date: Nov. 23, 2022

(87) PCT Pub. No.: WO2021/240487
PCT Pub. Date: Dec. 2, 2021

(65) Prior Publication Data
US 2023/0242280 A1 Aug. 3, 2023

(30) Foreign Application Priority Data
May 25, 2020 (FR) ........................................ 2005476

(51) Int. Cl.
*B64G 1/24* (2006.01)
*B64G 1/68* (2006.01)
(52) U.S. Cl.
CPC ............... *B64G 1/242* (2013.01); *B64G 1/68* (2013.01)
(58) Field of Classification Search
CPC . B64G 1/242; B64G 1/68; B64G 3/00; B64G 1/10; B64G 1/1085; B64G 1/52; B64G 1/247; B64G 1/24
See application file for complete search history.

(56) References Cited

U.S. PATENT DOCUMENTS

| 7,437,246 B2* | 10/2008 | Kelly | B64G 1/26 701/301 |
| 8,833,702 B2* | 9/2014 | Briskman | B64G 1/10 244/158.6 |

(Continued)

FOREIGN PATENT DOCUMENTS

WO 2013/169309 11/2013

OTHER PUBLICATIONS

Zhang Binbin, et al., "An analytic method of space debris cloud evolution and its collision evaluation for constellation satellites", Advances in Space Research, vol. 58, No. 6, Mar. 16, 2016, pp. 903-913 (11 pages).

(Continued)

*Primary Examiner* — Medhat Badawi
*Assistant Examiner* — Vicente Rodriguez
(74) *Attorney, Agent, or Firm* — Nixon & Vanderhye P.C.

(57) ABSTRACT

A method for adjusting the path of a satellite to limit a risk of collision with items of debris each having a date of closest pass with the satellite is disclosed including: propagating at least one orbit from the reference path of the satellite according to at least one manoeuvre to the farthest date of closest pass; determining a probability of collision for each item of debris according to the at least one orbit; determining at least one overall probability according to the set of probabilities determined; selecting the lowest overall probability from among the at least one overall probability obtained; determining a command for the satellite including the manoeuvre associated with the lowest overall probability.

10 Claims, 5 Drawing Sheets

(56) References Cited

U.S. PATENT DOCUMENTS

| | | | |
|---|---|---|---|
| 10,293,959 B2 * | 5/2019 | Alfano | B64G 1/10 |
| 2008/0033648 A1 | 2/2008 | Kelly et al. | |
| 2022/0081132 A1 * | 3/2022 | Mukae | B64G 3/00 |

OTHER PUBLICATIONS

International Search Report and English Translation for PCT/IB2021/055117 dated Aug. 26, 2021, 5 pages.
Written Opinion of the ISA for PCT/IB2021/055117 dated Aug. 26, 2021, 11 pages.

* cited by examiner

METHOD FOR ADJUSTING THE ORBITAL PATH OF A SATELLITE

CROSS REFERENCE TO RELATED APPLICATIONS

The present application is a National Phase of International Application Number PCT/IB2021/055117 filed Jun. 10, 2021, which designated the U.S. and claims priority benefits from French Application Number FR2005476 filed May 25, 2020, the entire contents of each of which are hereby incorporated by reference.

TECHNICAL FIELD OF THE INVENTION

The present invention relates to a method for adjusting the orbital path of a satellite in order to reduce a probability of collision of the satellite with a cloud of space debris. More particularly, the present invention relates to a method for determining one or more manoeuvres of the satellite orbiting the earth to reduce the probability of collision of the satellite with the cloud of orbital debris, that is, with all the orbital debris of the cloud.

PRIOR ART

Sequential debris avoidance strategies for a satellite based on a single manoeuvre on the opposite side of the orbit of a piece of debris are known in prior art. This strategy was adapted to the chemical propulsion satellite and considering the former population of tracked debris.

The current context is marked by an increase in mega constellation projects, where up to 1000 satellites can be operated. In addition, the number of tracked debris could increase from 20,000 to 100,000 objects when the detected radar surface of the debris is reduced from 10 centimetres to 5 centimetres. These two phenomena will create multi-debris conjunctions, where several pieces of debris have to be avoided.

In the case of electrically propelled satellites, space debris avoidance becomes more complex than for chemically propelled satellites. This is because the low thrust associated with electric propulsion does not usually enable avoidance to be performed in a single manoeuvre.

In addition, due to the low thrust associated with electric propulsion, satellite station-keeping manoeuvres are much more frequent. Therefore, to avoid mission disruption, hold manoeuvres can only be located in a dedicated location. In this way, hold manoeuvres will not be planned when the satellite is required for other purposes. Finally, in order to avoid operators commanding all hold manoeuvres, it is essential to calculate these hold manoeuvres with an automatic process.

To this end, sequential debris avoidance strategies by a satellite can no longer be applied.

DISCLOSURE OF THE INVENTION

The present invention aims to remedy these drawbacks with a completely new approach.

To this end, according to a first aspect, the present invention relates to a method for adjusting a satellite orbital path to limit a risk of collision with a cloud of space debris, each piece of debris including a date of closest passage with the satellite, the method including the steps of: determining a reference path of the orbit of the satellite from an initial time instant until the date of closest passage furthest from the initial time instant; determining an ephemeris of state transition data representative of the reference path of the orbit of the satellite; propagating, according to the determined ephemeris of state transition data, at least one first alternative orbit of the reference orbit of the satellite according to at least one first avoidance manoeuvre related to the satellite performed during at least one free manoeuvre time slot, and from at least one manoeuvre time instant of the at least one free manoeuvre time slot until the date of closest passage furthest from the initial time instant; analytically determining an individual probability of collision on each date of closest passage for each piece of debris according to the at least one first alternative orbit of the satellite; determining at least one overall probability of collision according to all the individual probabilities of collision determined according to the at least one first alternative orbit of the satellite related to the at least one first avoidance manoeuvre; selecting at least one first lowest overall probability of collision from the at least one overall probability obtained; determining a command of the satellite including at least the first manoeuvre related to the first lowest overall probability of collision selected.

The invention is implemented according to the embodiments and alternatives set out below, which are to be considered individually or in any technically operative combination.

Advantageously, the determination of a reference path of the orbit of the satellite can be determined according to a free drift propagation of the orbit of the satellite.

Advantageously, the step of propagating at least one first alternative orbit, the step of analytically determining an individual probability of collision and the step of determining at least one overall probability of collision, may be repeated iteratively along a plurality of directions of the at least one first avoidance manoeuvre so as to obtain a first plurality of alternative orbits related to a first plurality of avoidance manoeuvres and to evaluate a first plurality of overall probabilities of collision related to each of the alternative orbits related to the first plurality of avoidance manoeuvres.

Advantageously, each avoidance manoeuvre may comprise an initial value of maximum velocity variation allowed during the avoidance manoeuvre.

Advantageously, the method may comprise a step preceding the step of determining a command of the satellite, comprising adjusting the velocity variation of the at least one first avoidance manoeuvre of the command when the at least one previously selected lowest overall probability is less than a critical probability threshold of collision, so as to obtain at least one first overall probability of collision as close as possible to or equal to the critical probability threshold of collision.

Advantageously, the step of propagating at least one first alternative orbit, the step of analytically determining an individual probability of collision and the step of determining at least one overall probability of collision can be repeated according to a plurality of free manoeuvre slots of the satellite so as to obtain a second plurality of alternative orbits and to evaluate a second plurality of overall probabilities of collision related to the second plurality of alternative orbits.

Advantageously, the step of determining a command of the satellite may comprise a step of determining at least one second manoeuvre of the command of the satellite, said second manoeuvre being combined with the first manoeuvre related to the first lowest overall probability of collision, the at least one second manoeuvre producing a second alternative orbit enabling the calculation of a second lowest overall probability of collision according to the step of propagating the at least one first alternative orbit, the step of analytically determining an individual probability of collision, the step of determining at least one overall probability of collision and the step of selecting a first lowest overall probability of collision from the at least one overall probability obtained.

Advantageously, the determination of the second manoeuvre of the satellite command may include the step of determining a reference path of the orbit and the step of determining an ephemeris of state transition data according to which the reference path of the satellite is the path of the first alternative orbit of the satellite related to the first lowest overall probability of collision.

Advantageously, the ephemeris of state transition data may be an ephemeris of state transition matrix.

According to a second aspect, the present invention relates to a computer program product comprising instructions which, when the program is executed by a computer, cause the computer to implement the steps of the method described above.

According to a third aspect, the present invention relates to an information storage medium storing a computer program comprising instructions for implementing, by a processor, the method described above, when said program is read and executed by said processor.

BRIEF DESCRIPTION OF THE FIGURES

Further advantages, purposes and characteristics of the present invention will be apparent from the following description made, for explanatory and non-limiting purposes, with reference to the attached drawings, in which.

DESCRIPTION OF THE EMBODIMENTS

Figure 1:
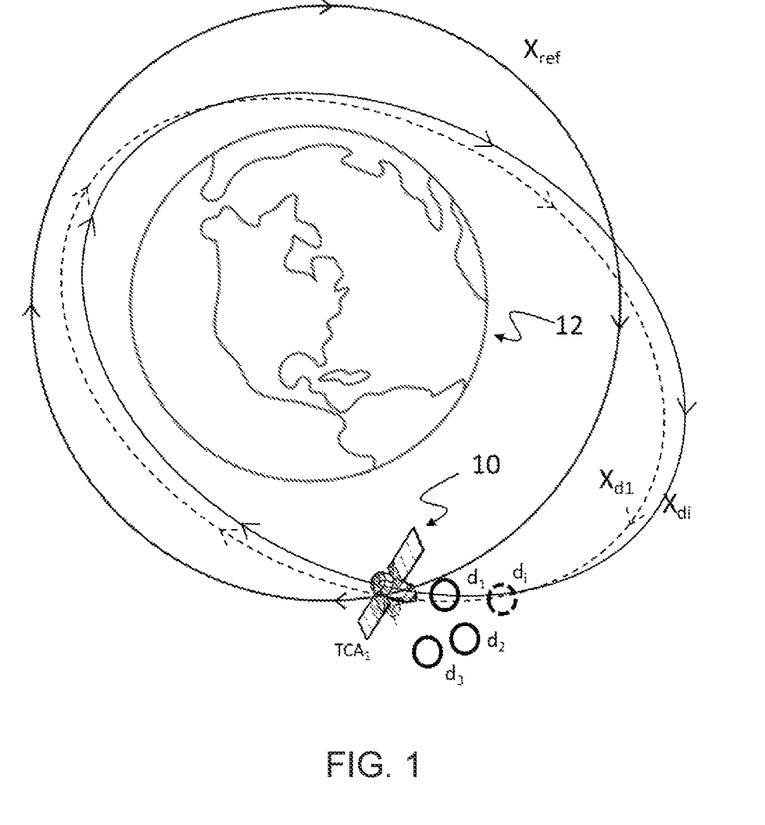
FIG. 1 is a schematic representation of a first risk of collision situation between a satellite orbiting the Earth and a piece of space debris from a cloud of space debris.
Figure 2:
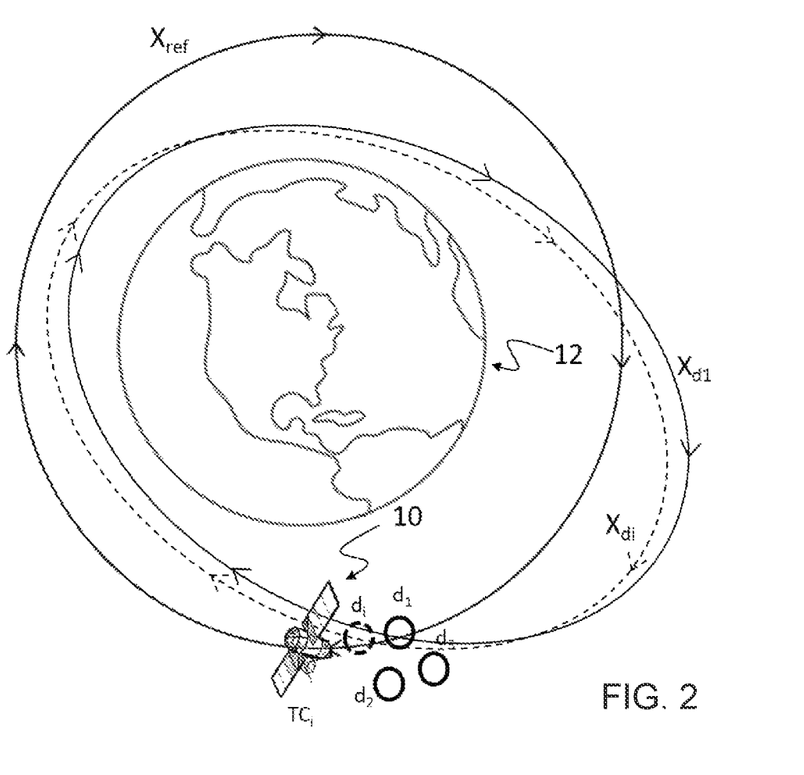
FIG. 2 is a schematic representation of a second risk of collision situation between the satellite orbiting the Earth and another piece of space debris of the cloud of space debris of FIG. 1.

According to FIG. 1 and FIG. 2, a satellite 10 orbiting the Earth 12 and a cloud of space debris $d_1$, $d_2$, $d_3$, $d_i$ comprising a plurality i of space debris $d_1$, $d_2$, $d_3$, $d_i$ also orbiting the Earth 12 are represented. The satellite 10 orbits the earth 12 along its reference orbit $X_{ref}$. Each piece of space debris $d_1$, $d_2$, $d_3$, $d_i$ of the cloud of debris comprises its own orbital path $X_{d1}$, $X_{di}$. Each piece of space debris $d_1$, $d_2$, $d_3$, $d_4$, $d_i$ is associated with an individual probability $P_1$, $P_i$ of collision with the satellite 12, each of the individual probabilities $P_1$, $P_i$ of collision being evaluated according to a date specific to each piece of debris, called the date of closest passage $TCA_1$, $TCA_i$, that is, the date on which the distance between the average paths of the satellite 10 and each piece of debris $d_1$, $d_2$, $d_3$, $d_i$ considered individually is the shortest.

It is known to evaluate an individual probability $P_i$ of collision between a satellite 10 and a single piece of space debris $d_1$ in several ways according to the thesis presented and defended on December 10, two thousand and fifteen by Romain Serra, entitled "Opérations de proximité en orbite: évaluation du risque de collision et calcul de manoeuvres optimales pour l'évitement et le rendez-vous", said thesis being publicly accessible especially via the "archives-ouvertes.fr" website under the reference tel-01261497. It will be noted in particular that a probability $P_i$ of collision between a satellite and a single piece of debris $d_1$ can be evaluated both according to a numerical integration calculation and according to an analytical formula in the form of a convergent series with positive terms.

Figure 3:
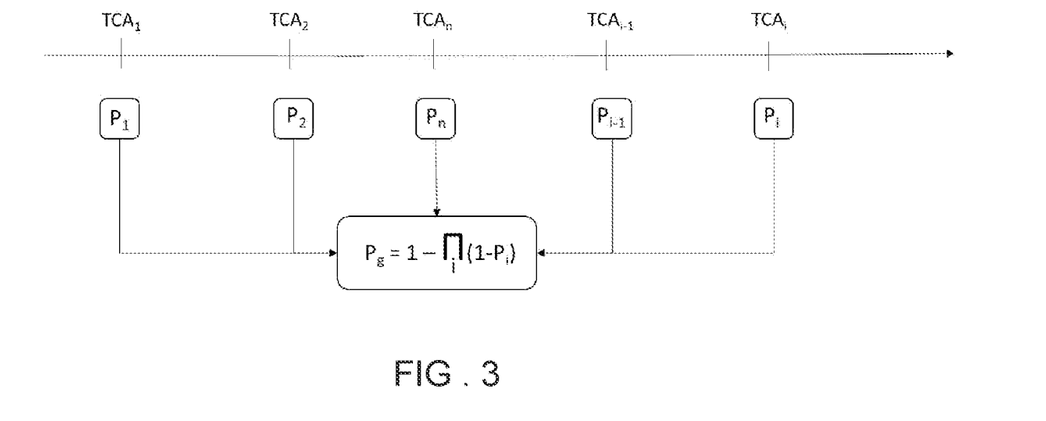
FIG. 3 is a schematic representation of an expression for an overall probability of collision from the individual probabilities of collision between the satellite and the entire cloud of debris of FIG. 1.

According to FIG. 3, a method for adjusting the orbital path of a satellite in order to reduce a probability of collision of the satellite with a cloud of space debris comprises determining the individual probability $P_i$ of collision of each piece of debris $d_1$, $d_2$, $d_3$, $d_i$ of the cloud with the satellite 12, each individual probability $P_1$, $P_i$ of collision having been evaluated according to its date of closest passage $TCA_1$, $TCA_i$.

To this end, the method for adjusting the orbital path of the satellite 10 requires the calculation of the probability of collision of the satellite 10 with the entire cloud of debris $d_1$, $d_2$, $d_3$, $d_i$. In the following, the probability of collision of the satellite 10 with the cloud of debris will be referred to as the overall probability $P_g$ of collision. The overall probability $P_g$ of collision according to the invention can be determined from all the individual probabilities $P_1$, $P_i$ of collision previously estimated, each on their date of closest passage $TCA_1$, $TCA_i$. Assuming that the probability calculation relating to an overall non-collision of the satellite 10 with the cloud of debris $d_1$, $d_2$, $d_3$, $d_i$ can be determined by the following formula:

$$1 - Pg = \prod_i (1 - Pi)$$

the overall probability $P_g$ of collision according to the invention is determined according to the formula:

$$Pg = 1 - \prod_i (1 - Pi)$$

For the purpose of evaluating, on a given initial date $t_0$, the individual probability $P_i$ of collision between a satellite 10 and a single piece of space debris $d_1$, it is necessary to be able to determine as precisely as possible the orbital position and the covariance of the orbital position that the satellite and the single piece of debris would have on the date of closest passage TCA1 according to the data of the orbital position and the covariance of the orbital position of the satellite and the single piece of debris on the initial date $t_0$.

According to the invention, it is necessary that the data on the orbital positions and covariance of the orbital positions of the debris $d_1$, $d_2$, $d_3$, $d_i$ of the cloud on the date of their closest passage $TCA_1$, $TCA_i$ with the satellite are previously known data, provided by space debris monitoring agencies such as, for example and in a non-limitative manner, the American organisation CSOpC (Combined Space Operations Center), or the international organisation SDA (The Space Data Association).

According to the invention, it is necessary to determine an ephemeris of data enabling the propagation of a state difference, also called ephemeris of state transition data, enabling a projection of the orbital position $X(t)$ and of the covariance Cov of the orbital position of the satellite 10 on the dates of closest passages $TC_1$, $TCA_i$.

In particular, it is possible to be able to propagate the relative motion of a satellite using a state transition matrix.

Figure 4:
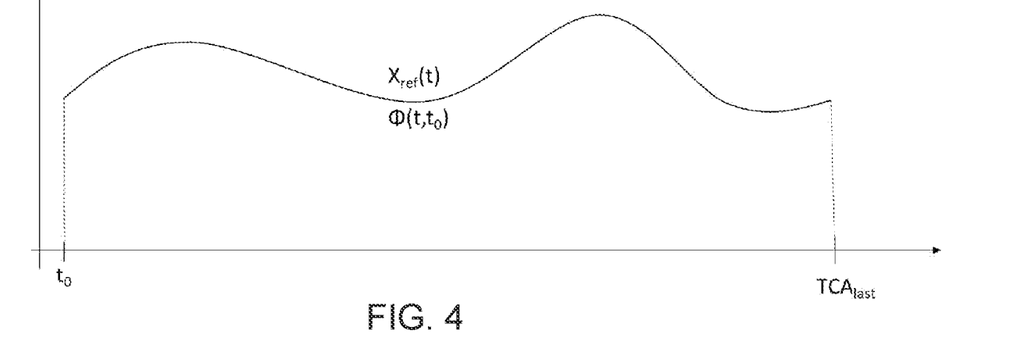
FIG. 4 is a schematic representation in the form of a time graph of a free drift propagation of the reference orbit of the satellite from an initial time instant until the date of closest passage of a piece of debris of the cloud with the satellite that is furthest from the initial time instant.

According to FIG. 4, one solution consists in performing a free drift propagation of the orbit of the satellite 10, that is, without manoeuvring the satellite 10, once from the initial date $t_0$ of determination of the overall probability $P_g$ of collision until the date of closest passage $TCA_{last}$ furthest from the initial date $t_0$ of a piece of debris $d_1$, $d_2$, $d_3$, $d_i$ of the cloud. In this respect, two ephemerides are determined, namely an ephemeris of the reference orbit $X_{ref}$ of the satellite 10 and an ephemeris of the state transition matrix $\phi(t, t_0)$ corresponding to the path of the reference orbit $X_{ref}$. This determination especially makes it possible to calculate all the state transition matrices $\phi(t_n, t_m)$ According to FIG. 5, the first satellite 10 orbiting the Earth 12 is in communication with a control centre 14 of the satellite 10 via a radio frequency communication means 16. The control centre 14 of the satellite 10 may be configured to command orbital path manoeuvres of the satellite 10 especially by commanding thrusts of the satellite 10 according to a variation of the orbital velocity $\Delta V$ of the satellite 10 in a direction $\vec{d}$ of the thrust. According to FIG. 5, an example of a period of revolution of the satellite 10 around the Earth, also called the orbital period of the satellite 10 around the Earth 12, is represented schematically by a discontinuous circle formed by several arcs of circle. Each arc represents a time slot that can be dedicated to an operation of the satellite 10. As a non-limiting example, and according to FIG. 5, the orbital period of satellite 10 may comprise two time slots for charging a battery for powering the satellite 10, two other time slots for correcting the attitude of satellite 10 if necessary, another time slot for a mission to photograph the Earth 12, and finally two other time slots available for any other operations of the satellite.

In the following, the available time slots will be referred to as free manoeuvre slots $Sl_1$, $Sl_2$.

Figure 5:
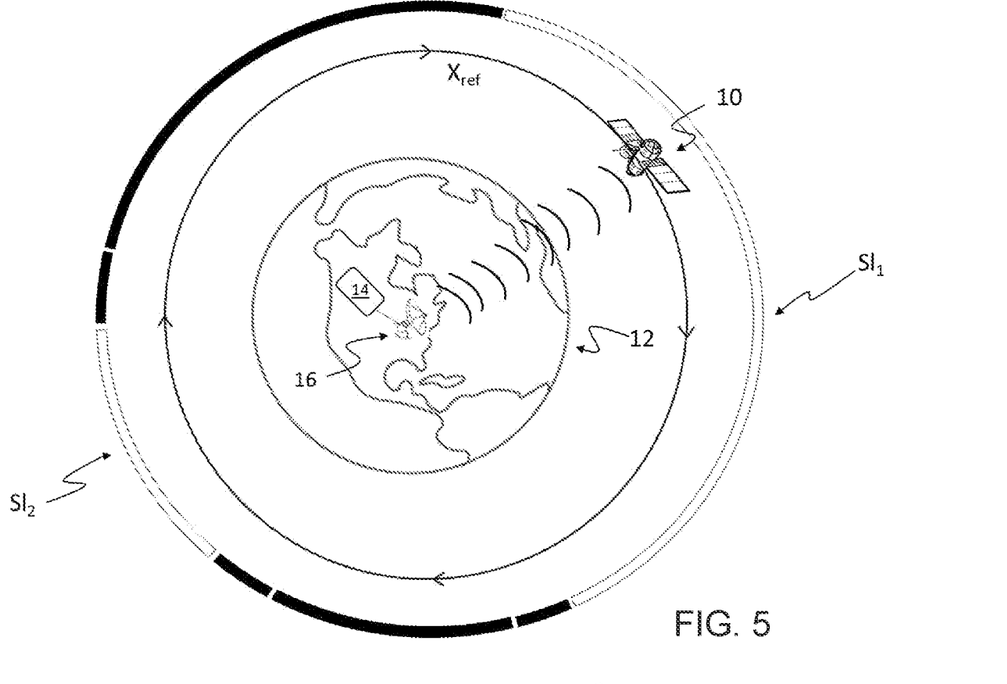
FIG. 5 is a schematic representation of a satellite control centre for commanding the satellite according to a plurality of time slots.

According to the invention, the method for adjusting the orbital path of the satellite 10 consists in determining the manoeuvre or manoeuvres necessary to command the satellite 10 during the free slot or slots $Sl_i$, in order to simultaneously avoid all the debris $d_1$, $d_2$, $d_3$, $d_i$ of the cloud when the initial overall probability $P_{g0}$ of collision of the satellite 10 with the cloud of debris $d_1$, $d_2$, $d_3$, $d_i$ is greater than a critical probability threshold $P_{th}$ of collision; the initial overall probability $P_{g0}$ of collision of the satellite 10 being determined according to the reference orbit $X_{ref}$ of satellite 10.

According to the invention, in general, the term time slot may comprise simply an occasional date on which it is possible to command an orbital path adjustment manoeuvre of the satellite 10.

Known prior art enabling the determination of one or more avoidance manoeuvres for a single piece of debris at a time is not contemplatable. Indeed, in the context of avoidance of a cloud of debris $d_1$, $d_2$, $d_3$, $d_i$ is not possible to determine an avoidance manoeuvre for a first piece of debris $d_1$ of the cloud without taking account of the other debris $d_2$, $d_3$, $d_i$ of the cloud. In addition, the calculation time of the cumulative avoidance manoeuvre for each of the debris would be too heavy and not fast enough for the avoidance of the cloud of debris $d_1$, $d_2$, $d_3$, $d_i$.

According to the invention, a fast propagation based on the state transition matrix $\phi(t, t_0)$ and the ephemeris of the reference orbit $X_{ref}$ of the satellite 10 enables the calculation of the effect of a manoeuvre during any of the free manoeuvre slots $Sl_1$, $Sl_i$ of the satellite 10. The ephemerides will be used in the optimisation process to test a large number of possible thrust directions in order to calculate the effect on the overall probability $P_g$ of a manoeuvre during any of the free manoeuvre slots $Sl_1$, $Sl_i$ of the satellite 10.

The ephemerides of the orbit of the satellite 10 can be considered as a reference path that does not take account of the manoeuvre under consideration. The idea of calculating the real path is to modify this reference path by means of the ephemerides of the state transition matrix $\phi(t, t_0)$.

To this end, the method for adjusting the orbital path of the satellite 10 comprises determining a first manoeuvre $\Delta V$. $\vec{d}$ and a free slot $Sl_n$ enabling the execution of the first manoeuvre $\Delta V.\vec{d}$ so as to best optimise the overall probability $P_g$ of collision, that is, preferably to obtain an overall probability $P_g$ of collision less than or equal to the critical probability threshold $P_{th}$ of collision.

Figure 6:
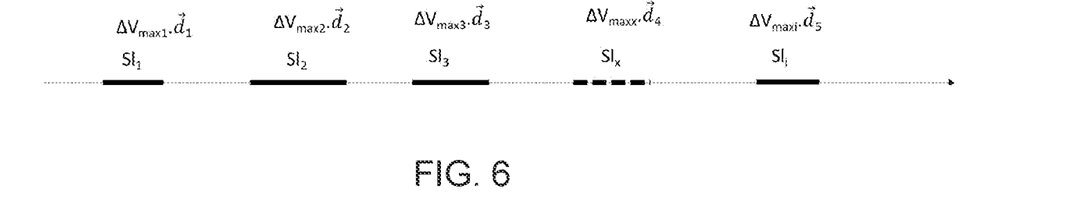
FIG. 6 is a schematic time representation of a plurality of avoidance manoeuvre free time slots dedicated to the satellite, each free time slot being associated with a maximum orbital velocity variation of the satellite allowed during the free time slot.

To this end, according to FIG. 6, each free manoeuvre slot $Sl_1$, $Sl_i$ is associated with a maximum velocity variation $\Delta V$. The maximum variation $\Delta V max$ of the velocity may be related for example and in a non-limiting manner either to the duration of the free manoeuvre slot $Sl_1$, $Sl_i$ or to the maximum energy consumption of the electric propulsion device of the satellite 10 allowed for a manoeuvre. It will also be necessary according to the invention, that a minimum variation of the velocity of the satellite 10 is defined, this minimum variation being related to the minimum thrust energy required by the satellite 10 to perform a change of orbit of the satellite 10.

Figure 7:
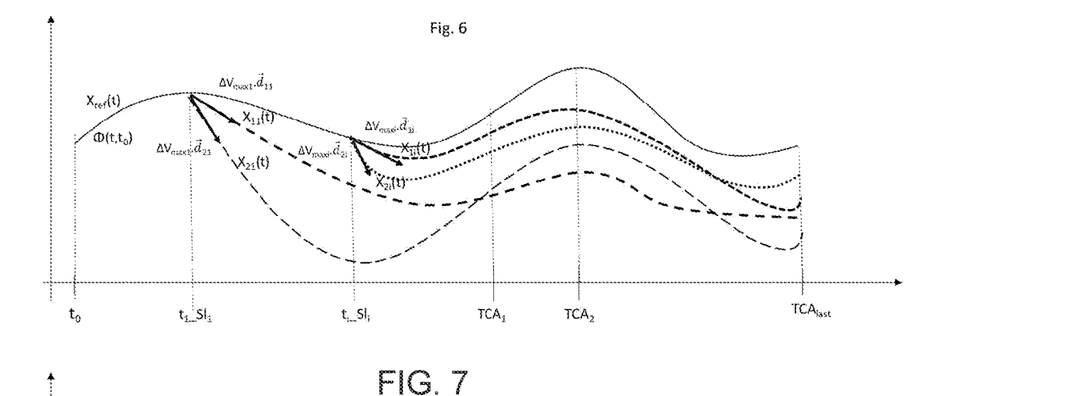
FIG. 7 is a schematic representation of several examples of orbits of the satellite deviating from the reference orbit $X_{ref}$ following examples of orbital manoeuvre operations of the satellite.

According to FIG. 7, several examples of orbits of the satellite 10 deviating from its reference orbit $X_{ref}$ as a result of manoeuvre operations are represented. A first avoidance orbit $X_{11}$ of satellite 10 deviating from the reference orbit $X_{ref}$ is represented. Said first avoidance orbit $X_{11}$ follows a first avoidance manoeuvre $\Delta V_{max1} \cdot \vec{d}_{11}$ commanded at a first manoeuvre time instant t_Sl$_1$ associated with the first free manoeuvre slot Sl$_1$. The reference orbit $X_{ref}$ of the satellite 10 before the first manoeuvre $\Delta V_{max1} \cdot \vec{d}_{11}$ at the manoeuvre time instant t_Sl$_1$ is directly determined according to the reference orbit $X_{ref}$ determined at the manoeuvre time instant t_Sl$_1$, and denoted as $X_{ref}$(t_Sl$_1$). More particularly, this orbit $X_{ref}$(t_Sl$_1$) can be determined by using the reference orbit $X_{ref}$ by interpolating it into the generated ephemerides.

The determination of the first avoidance orbit $X_{11}$(t_Sl$_1$) evaluated at the manoeuvre time instant t_Sl$_1$ following the first avoidance manoeuvre $\Delta V_{max1} \cdot \vec{d}_{11}$ can be calculated by updating the reference orbit $X_{ref}$(t_Sl$_1$) at the manoeuvre time instant t_Sl$_1$ according to the first avoidance manoeuvre $\Delta V_{max1} \cdot \vec{d}_{11}$. For Cartesian elements, this corresponds to performing a velocity increment $\Delta V_{max1}$ with the direction $\vec{d}_{11}$ of the manoeuvre expressed in the reference frame associated with these Cartesian elements. For Keplerian, circular and equinoctial elements, the Gaussian equation provides this delta state. In all cases, the calculation of the orbital deviation created by the first avoidance manoeuvre $\Delta V_{max1} \cdot \vec{d}_{11}$ can be written: $\Delta X_{11}$(t_Sl$_1$)=F($\Delta V_{max1} \cdot \vec{d}_{11}$, $X_{ref}$(t_Sl$_1$)). Knowing the state transition matrices $\phi$(TCA$_i$, t$_0$) and $\phi$(t_Sl$_1$, t$_0$) determined previously, the orbital deviation $\Delta X_{11}$(TCA$_i$) of the satellite 10 on each of the dates of closest passages TCA$_i$ can be determined according to the formula:

$$\Delta X_{11}(TCA_i) = \phi(TCA_i, t\_Sl_1) \Delta X_{11}(t\_Sl_1) = \phi(TCA_i, t_0) \phi(t\_Sl_1, t_0)^{-1} \Delta X_{11}(t\_Sl_1)$$

In order to be able to calculate all individual probabilities of collision P$_i$ between satellite 10 according to its first avoidance orbit X11 following the first avoidance manoeuvre $\Delta V_{max1} \cdot \vec{d}_{11}$, and all debris d$_1$, d$_2$, d$_3$, d$_i$ of the cloud according to their respective date of closest passage TCA$_i$, it is necessary to determine the first avoidance orbit $X_{11}$(TCA$_i$) on each of said dates of closest passages TCA$_i$. In this respect, the reference orbit $X_{ref}$(TCA$_i$) can be determined on each of the dates of closest passage TCA$_i$ by interpolating this reference orbit $X_{ref}$(TCA$_i$) into the ephemerides generated according to each of the dates of closest passage TCA$_i$. Finally, the first avoidance orbit $X_{11}$(TCA$_i$) on each of said dates of closest passage TCA$_i$ can be determined according to the formula:

$$X_{11}(TCAi) = X_{ref}(TCAi) + \Delta X_{11}(TCAi)$$

In order to be able to calculate all individual probabilities of collision P$_i$ between the satellite 10 according to its first avoidance orbit $X_{11}$ following the first avoidance manoeuvre $\Delta V max_1 \cdot \vec{d}_{11}$, and all the debris d$_1$, d$_2$, d$_3$, d$_i$ of the cloud according to their respective date of closest passage TCA$_i$, it is necessary to determine the covariance $COV_{TCAi}$ of the orbital position of the satellite on each of said dates of closest passages TCA$_i$. Knowing the state transition matrix $\phi$(TCA$_i$, t$_0$) determined previously, and the covariance $COV_{r0}$ of the orbital position of the satellite 10 on the initial date $_0$, the determination of the covariance $COV_{TCAi}$ projected to each of the dates of closest passage TCA$_i$ is determined by the following formula:

$$cov_{TCAi} = \phi(TCAi, t_0) \times cov_{t_0} \times \phi(TCAi, t_0)^t$$

The first avoidance orbit $X_{11}$ of satellite 10 after the first avoidance manoeuvre $\Delta V max_1 \cdot \vec{d}_{11}$, being determined on each date of closest passage TCA$_i$, as well as the covariance $COV_{TCAi}$ on each date of closest passage TCA$_i$, the orbit of each piece of debris d$_1$, d$_2$, d$_3$, d$_i$ and their covariance on their date of closest passage TCA$_i$ being also known, the method for adjusting the orbital path of the satellite 10 may comprise determining all the individual probabilities of collision P$_i$ between the satellite 10 according to its first avoidance orbit $X_{11}$ following the first avoidance manoeuvre $\Delta V max_1 \cdot \vec{d}_{11}$, and all debris d$_1$, d$_2$, d$_3$, d$_i$ of the cloud according to their respective date of closest passage TCA$_i$. To this end, the overall probability $P_{g11}$ of collision related to the first avoidance manoeuvre $\Delta V max_1 \cdot \vec{d}_{11}$ performed during the first free manoeuvre slot SL$_1$ can be calculated and compared with a critical probability threshold P$_{th}$ of collision.

According to FIG. 7, the method for adjusting the orbital path of the satellite 10 may comprise determining the overall probability P$_g$ of collision as a function of different directions $\vec{d}$ of a manoeuvre performed during the same free manoeuvre slot SL$_1$ and according to a given orbital velocity variation $\Delta V$ of the satellite 10. According to FIG. 7, a second avoidance orbit $X_{21}$ of the satellite 10 representing an alternative to the first orbit $X_{11}$ is represented. This second orbit, called second alternative avoidance orbit $X_{21}$ is obtained after the application of a second alternative avoidance manoeuvre $\Delta V max_1 \cdot \vec{d}_{21}$ different from the first avoidance manoeuvre $\Delta V max_1 \cdot \vec{d}_{11}$ during the same first free manoeuvre slot SL$_1$. This so-called second alternative avoidance manoeuvre $\Delta V max_1 \cdot \vec{d}_{21}$ differs from the first avoidance manoeuvre $\Delta V max_1 \cdot \vec{d}_{11}$ in that the direction $\vec{d}_{21}$ applied to the thrust of the satellite 10 according to the same orbital velocity variation $\Delta V_{max1}$ differs from the first direction $\vec{d}_{11}$. In this respect, a second alternative avoidance orbit $X_{21}$(TCA$_i$) of the satellite 10 on all dates of closest passage TCA$_i$ is also determined in the same way as described for the first avoidance orbit $X_{11}$(TCA$_i$). Knowing also the covariance $COV_{TCAi}$ for each of the dates of closest passage TCA$_i$, a second alternative overall probability $P_{g12}$ of collision related to the second alternative avoidance manoeuvre $\Delta V_{max1} \cdot \vec{d}_{21}$ performed during the first free manoeuvre slot Sl$_1$ can be calculated and compared with the critical probability threshold P$_{th}$ of collision and also with the overall probability $P_{g11}$ of collision related to the first avoidance manoeuvre $\Delta V max_1 \cdot \vec{d}_{11}$ performed during the first free manoeuvre slot Sl$_1$.

According to FIG. 7, the method for adjusting the orbital path of the satellite 10 may comprise determining an overall probability P$_g$ of collision as a function of the positioning in time of a manoeuvre $\Delta V \vec{d}$. In other words, the overall probability P$_g$ of collision is also a function of the free manoeuvre slot Sl$_1$, Sl$_i$ during which a manoeuvre is performed. According to FIG. 7, a third alternative avoidance manoeuvre $\Delta V max_i \cdot \vec{d}_{1i}$ performed during any of the free slots Sl$_i$ distinct from the first free slot Sl$_1$ of manoeuvre is represented. To this end, a third alternative avoidance orbit $X_{1i}$(TCA$_i$) of the satellite 10 specific to each of the dates of closest passage TCA$_i$ is also determined in the same way as described for the first avoidance orbit $X_{11}$(TCA$_i$). Also knowing the covariance $COV_{TCAi}$ for each of the dates of closest passage TCA$_i$, a third alternative overall probability $P_{g1i}$ of collision associated with the third avoidance manoeuvre $\Delta V max_i \cdot \vec{d}_{1i}$ performed during said any of the free slots $Sl_i$ distinct from the first free manoeuvre slot $Sl_1$ can be determined and compared with the critical probability threshold $P_{th}$ of collision and also with the lowest overall probability $P_g$ of collision determined during the first free manoeuvre slot $Sl_1$.

In the same way as previously described, the method for adjusting the orbital path of the satellite 10 may comprise determining the overall probability $P_g$ of collision as a function of different directions $\vec{d}$ of a manoeuvre performed during any free slot $Sl_i$ and according to a given orbital velocity variation $\Delta V$ of the satellite 10. According to FIG. 7, a fourth alternative avoidance orbit $X_{2i}$ of the satellite 10 deviating from the reference orbit $X_{ref}$ at the manoeuvre time instant t_Sli representing an alternative of the previously described third alternative avoidance orbit $X_{1i}$ is represented. This fourth alternative avoidance orbit $X_{2i}$ is obtained after the application of a fourth alternative avoidance manoeuvre $\Delta V max_i . \vec{d}_{2i}$ different from the third alternative avoidance manoeuvre $\Delta V max_i . \vec{d}_{1i}$ associated with the previously described third alternative avoidance orbit $X_{1i}$. This so-called fourth alternative avoidance manoeuvre $\Delta V max_i . \vec{d}_{2i}$ differs from the third alternative avoidance manoeuvre $\Delta V max_i . \vec{d}_{1i}$ in that the direction $\vec{d}_{2i}$ applied to the thrust of the satellite 10 according to the same orbital velocity variation $\Delta V max_i$ differs from the direction $\vec{d}_{1i}$ of the third alternative avoidance manoeuvre $\Delta V max_i . \vec{d}_{1i}$. In this respect, a fourth alternative avoidance orbit $X_{2i}(TCA_i)$ of the satellite 10 related to the fourth alternative avoidance manoeuvre $\Delta V max_i . \vec{d}_{1i}$ is also determined on all dates of closest passages $TCA_i$ in the same way as described for the first avoidance orbit $X_{11}(TCA_i)$. Knowing also the covariance $COV_{TCAi}$ for each of the dates of closest passage $TCA_i$, a fourth alternative overall probability $P_{g2i}$ of collision related to the fourth alternative avoidance manoeuvre $\Delta V max_i . \vec{d}_{2i}$ performed during said any of the free slots $Sl_i$ distinct from the first free manoeuvre slot $Sl_1$ can be calculated and compared with the critical probability threshold $P_{th}$ of collision and also with the third alternative overall probability $P_{g1i}$ of collision related to the third alternative avoidance manoeuvre $\Delta V max_i . \vec{d}_{1i}$ performed during the same free slot $Sl_i$.

According to the determination of one or more overall probabilities of collision $P_g$ as described in FIG. 7, under the hypothesis that at least one of the determined overall probabilities of collision $P_g$ would be less than or equal to the critical probability threshold $P_{th}$ of collision, then a single avoidance manoeuvre $\Delta V max . \vec{d}$ performed during a single free slot $Sl_i$ would enable collision avoidance of the satellite 10 with all the debris $d_1$, $d_2$, $d_3$, $d_i$ of the cloud. According to this hypothesis, several strategies of the method for adjusting the orbital path of satellite 10 are possible.

A first strategy may consist in determining the first manoeuvre $\Delta V . \vec{d}$ enabling collision avoidance, that is, the avoidance manoeuvre $\Delta V . \vec{d}$ for which the overall probability $P_g$ of collision associated with this manoeuvre, and thus the free slot $Sl_i$ associated with the manoeuvre, is less than or equal to the critical probability threshold $P_{th}$ of collision. In order to determine the collision avoidance manoeuvre $\Delta V . \vec{d}$, it will be necessary, for example, to first set a parameter of orbital velocity variation $\Delta V$ of the satellite 10, for example and preferably according to its maximum value $\Delta V max_i$ allowed during the free slot $Sl_i$ under consideration and to vary the direction $\vec{d}$ of the manoeuvre. This operation is repeated on all the slots until a manoeuvre $\Delta V max_i . \vec{d}$ is obtained that enables an overall probability less than or equal to the critical probability threshold $P_{th}$ of collision to be obtained. The choice of the maximum allowed value $\Delta V max_i$ of orbital velocity variation is a relatively relevant choice to obtain a lower overall probability $P_g$ with orbital velocity variations $\Delta V$ less than the maximum variation $\Delta V max_i$.

In the case of an overall probability $P_g$ obtained strictly less than the critical probability threshold $P_{th}$ of collision, a reduction in the maximum velocity variation $\Delta V_{max}$ is possible in order to obtain an overall probability $P_g$ of collision preferably equal to, or very close to, the critical probability threshold $P_{th}$ of collision. In this way, the energy required for the identified manoeuvre will be reduced to a minimum.

It will be necessary according to the invention, that the determination of an orbital velocity variation $\Delta V$ combined with a determination of manoeuvre direction $\vec{d}$ can be performed, for example and in a non-limiting manner, by dichotomy algorithms or Brent methods. It should be noted that a velocity variation $\Delta V$ may be associated with an optimal manoeuvre direction $\vec{d}$.

A second strategy may consist in determining, over a free slot $Sl_i$ under consideration, the avoidance manoeuvre $\Delta V \vec{d}$ enabling the lowest overall probability $P_g$ of collision as a function of all possible manoeuvre directions $\vec{d}$, the orbital velocity variation $\Delta V$ of the manoeuvre preferably also being set to the maximum velocity variation $\Delta V max_i$ allowed on the free slot $Sl_i$ under consideration. If the free slot $Sl_i$ under consideration does not make it possible to obtain an overall probability $P_g$ less than or equal to the critical probability threshold $P_{th}$ of collision, the determination should be repeated on another free slot $Sl_i$. In case this other free slot $Sl_i$ enables an overall probability $P_g$ less than the critical probability threshold $P_{th}$ of collision, a reduction in the maximum orbital velocity variation $\Delta V_{max}$ of the manoeuvre $\Delta V_{max} \vec{d}$ determined is possible in order to obtain an overall probability $P_g$ of collision preferably equal to, or even very close to, the critical probability threshold $P_{th}$ of collision.

A third strategy may consist in determining, over all the previously identified free slots $Sl_i$, the avoidance manoeuvre $\Delta V \vec{d}$ enabling the lowest overall probability $P_g$ of collision as a function of all the directions $\vec{d}$ of possible manoeuvres for each free slot $Sl_i$, the orbital velocity variation $\Delta V$ of the manoeuvre also preferably being set to the maximum velocity variation $\Delta V max_i$ allowed for each free slot $Sl_i$. Similarly to the first strategy, in the case where the identified avoidance manoeuvre $\Delta V \vec{d}$ enables an overall probability $P_g$ less than the critical probability threshold $P_{th}$ of collision, a reduction in the maximum orbital velocity variation $\Delta V_{max}$ of the manoeuvre $\Delta V_{max} \vec{d}$ determined is possible in order to obtain an overall probability $P_g$ of collision preferably equal to, or even very close to, the critical probability threshold $P_{th}$ of collision.

It is well understood that other strategies for determining a collision avoidance manoeuvre $\Delta V \vec{d}$ according to the description in FIG. 7 are possible, so that the invention is not limited to the three examples of collision avoidance strategy previously described.

According to the invention, it is also likely that a single avoidance manoeuvre $\Delta V \vec{d}$ may not be sufficient to avoid a collision between the satellite 10 and all the debris of the cloud. In other words, it is also likely, according to the invention, that a single manoeuvre $\Delta V \vec{d}$ may not enable an overall probability $P_g$ of collision less than or equal to the critical probability threshold $P_{th}$ of collision to be obtained.

Figure 8:
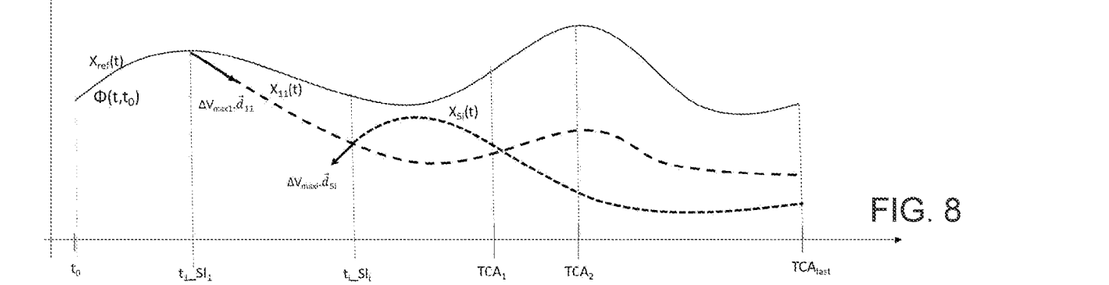
FIG. 8 is a schematic representation of an example combination of two avoidance orbital manoeuvres associated with the satellite.

To this end, according to FIG. 8, a first avoidance manoeuvre $\Delta V max_1.\vec{d}_{11}$ and a second avoidance manoeuvre $\Delta V max_i.\vec{d}_{5i}$ of the satellite 10 following the first avoidance manoeuvre $\Delta V max_1.\vec{d}_{11}$ are represented, the combination of the first avoidance manoeuvre $\Delta V max_1.\vec{d}_{11}$ with the second avoidance manoeuvre $\Delta V max_i.\vec{d}_{5i}$ enabling avoidance of the collision of the satellite 10 with the debris $d_1$, $d_2$, $d_3$, $d_i$ of the cloud. More particularly, the first avoidance manoeuvre $\Delta V max_1.\vec{d}_{11}$ represented is the first avoidance manoeuvre $\Delta V max_1.\vec{d}_{11}$ represented in FIG. 7 for which a first avoidance orbit $X_{11}$ deviating from the reference orbit $X_{ref}$ has been determined. It will be necessary to hypothesise that of all the manoeuvres $\Delta V \vec{d}$ estimated in accordance with the description in FIG. 7, the first avoidance manoeuvre $\Delta V max_1.\vec{d}_{11}$ commanded at the first manoeuvre time instant $t\_Sl_1$ associated with the first free manoeuvre slot $Sl_1$ has been identified as the avoidance manoeuvre $\Delta V max_1.\vec{d}_{11}$ for obtaining the lowest overall probability $P_g$ of collision$_{11}$ in comparison with the determination of all other estimated overall probabilities of collision $P_g$ associated with the manoeuvre alternatives $\Delta V \vec{d}$ performed from the reference orbit $X_{ref}$ as described in FIG. 7. It will also be necessary to assume according to FIG. 8 that the overall probability $P_g$ of collision$_{11}$ associated with said first avoidance manoeuvre $\Delta V max_1.\vec{d}_{11}$ is greater than the critical probability threshold of collision $P_{thr}$. To this end, it is necessary to determine at least one second avoidance manoeuvre $\Delta V max_1.\vec{d}_{5i}$ of the satellite 10 following the first avoidance manoeuvre $\Delta V max_1.\vec{d}_{11}$ so as to reduce the overall probability $P_g$ of collision with the objective of obtaining in the end an overall probability $P_g$ of collision at least equal to, or even less than, the critical probability threshold $P_{thr}$ of collision. It will be necessary to name this second manoeuvre as the second avoidance manoeuvre $\Delta V max_i.\vec{d}_{5i}$ in the following description of the invention.

According to FIG. 8, a second avoidance orbit $X_{5i}$ in continuity with the first avoidance orbit $X_{11}$ is represented. This second orbit $X_{5i}$, called second avoidance orbit $X_{5i}$, follows the second avoidance manoeuvre $\Delta V max_i.\vec{d}_{5i}$ commanded at any of the free slots $Sl_i$ distinct from the first free manoeuvre slot $Sl_1$. The first avoidance orbit $X_{11}$ of the satellite 10 at the manoeuvre time instant $t\_Sl_i$ before the second avoidance manoeuvre $\Delta V max_i.\vec{d}_{5i}$ is directly determined, since it has been previously determined according to the description in FIG. 7. The first avoidance orbit $X_{11}$ of the satellite 10 at the manoeuvre time instant $t\_Sl_i$ before the second avoidance manoeuvre $\Delta V max_i.\vec{d}_{5i}$ is denoted as $X_{11}(t\_Sl_i)$.

The determination of the second avoidance orbit $X_{5i}(t\_Sl_i)$ evaluated at the manoeuvre time instant $t\_Sl_i$ following the second avoidance manoeuvre $\Delta V max_i.\vec{d}_{5i}$ can be calculated by updating the first orbit $X_{11}(t\_Sl_i)$ at the manoeuvre time instant $t\_Sl_i$ according to the second avoidance manoeuvre $\Delta V max_i.\vec{d}_{5i}$. For Cartesian elements, this corresponds to the second avoidance manoeuvre $\Delta V max_i.\vec{d}_{5i}$ in the inertial reference frame. For Keplerian, circular and equinoctial elements, the Gaussian equation provides this delta state. In all cases, the calculation of the orbital deviation created by the second avoidance manoeuvre $\Delta V max_i.\vec{d}_{5i}$ can be written: $\Delta X_{5i}(t\_Sl_i) = F(\Delta V max_i.\vec{d}_{5i}, X_{11}(t\_Sl_i))$. In the same way as described in FIG. 4, considering that the first orbit $X_{11}$ is a new reference orbit with respect to the second avoidance manoeuvre $\Delta V max_i.d_{5i}$, the orbital deviation $\Delta X_{5i}(TCA_i)$ of the satellite 10 on each of the dates of closest passages $TCA_i$ can be determined according to the formula:

$$\Delta X_{5i}(TCA_i) = \phi(TCA_i, t\_Sl_i) \Delta X_{5i}(t\_Sl_i) = \phi(TCA_i, t\_Sl_1) \phi(t\_Sl_i, t\_Sl_1)^{-1} \Delta X_{5i}(t\_Sl_i)$$

In order to be able to calculate all individual probabilities of collision Pi between the satellite 10 according to its second avoidance orbit $\Delta X_{5i}(t\_Sl_i)$ following the second avoidance manoeuvre $\Delta V max_i.\vec{d}_{5i}$, and all debris $d_1$, $d_2$, $d_3$, $d_i$ of the cloud according to their respective date of closest passage $TCA_i$, it is necessary to determine the second avoidance orbit $X_{5i}(t\_Sl_i)$ on each of said dates of closest passages $TCA_i$. In this respect, the first avoidance orbit $X_{11}(TCA_i)$ can be determined on each of the dates of closest passage $TCA_i$ by interpolating this first avoidance orbit $X_{11}(TCA_i)$ into the ephemerides generated according to each of the dates of closest passage $TCA_i$. Finally, the second avoidance orbit $X_{5i}(t\_Sl_i)$ can be determined on each of said dates of closest passages $TCA_i$ according to the formula:

$$X_{5i}(TCAi) = X_{11}(TCA_i) + \Delta X_{5i}(TCA_i)$$

The second avoidance orbit $X_{5i}$ of the satellite 10 after the second avoidance manoeuvre $\Delta V max_i.\vec{d}_{5i}$ as well as the orbital covariance $COVTCA_i$ of the satellite 10 being determined on each date of closest passage $TCA_i$, the orbit of each piece of debris $d_1$, $d_2$, $d_3$, $d_i$ and their covariance on their date of closest passage $TCA_i$ being also known, the method for adjusting the orbital path of satellite 10 may comprise determining all the individual probabilities of collision Pi between the satellite 10 according to its second consecutive orbit $X_{5i}$ following the second avoidance manoeuvre $\Delta V max_i.\vec{d}_{5i}$, and all debris $d_1$, $d_2$, $d_3$, $d_i$ of the cloud according to their respective date of closest passage $TCA_i$. To this end, the overall probability $P_{g5i}$ of collision related to the second avoidance manoeuvre $\Delta V max_i.\vec{d}_{5i}$ performed during said any of the free slots $Sl_i$ distinct from the first manoeuvre slot $Sl_1$ can be calculated and compared with a critical probability threshold $P_{th}$ of collision.

Similarly to FIG. 7, the method for adjusting the orbital path of the satellite 10 may comprise determining a plurality of other overall probabilities $P_g$ of collision according to a plurality of further second alternative avoidance manoeuvres $\Delta V \vec{d}$ in combination with the first avoidance manoeuvre $\Delta V max_1.\vec{d}_{11}$, each representing an alternative of the second $\Delta V max_i.\vec{d}_{5i}$ avoidance manoeuvre represented in FIG. 8; these other second alternative avoidance manoeuvres $\Delta V \vec{d}$ being according to another free manoeuvre execution slot $Sl_i$ and/or along another manoeuvre direction $\vec{d}$ than the second avoidance manoeuvre $\Delta V max_i.\vec{d}_{5i}$ as represented in FIG. 8. Each of the overall probabilities of collision $P_g$ each related to one of the other second alternative avoidance manoeuvres $\Delta V \vec{d}$ can be compared with the critical probability threshold $P_{th}$ of collision and with all other overall probabilities of collision $P_g$ related to the other second avoidance manoeuvres $\Delta V \vec{d}$.

To this end, according to FIG. 8, under the hypothesis of at least one overall probability $P_g$ of collision, related to a second avoidance manoeuvre $\Delta V \vec{d}$ less than or equal to the critical probability threshold $P_{th}$ of collision, it will be necessary according to the invention and in a non-limiting manner, to be able to determine the second avoidance manoeuvre $\Delta V \vec{d}$ enabling the avoidance of the collision of the satellite 10 with all the debris $d_1$, $d_2$, $d_3$, $d_i$ of the cloud according to at least one of the three strategies of the method for adjusting the orbital path of the satellite 10 similar to the three strategies described in the preceding paragraphs relating to FIG. 7.

In the case of an overall probability $P_g$ strictly less than the critical probability threshold $P_{th}$ of collision after the application of the second avoidance manoeuvre $\Delta Vmax_i.\vec{d}_{5i}$ following the first avoidance manoeuvre $\Delta Vmax_i.\vec{d}_{1i}$, a reduction in the maximum velocity variation $\Delta V_{max}$ is possible in order to obtain an overall probability $P_g$ of collision preferably equal to, or even very close to, the critical probability threshold $P_{th}$ of collision. In this way, the energy required for the identified second avoidance manoeuvre $\Delta V \vec{d}$ will be reduced to a minimum.

According to the invention, and in accordance with the description in FIG. 7 and FIG. 8, the first avoidance manoeuvre and the second avoidance manoeuvre may each be manoeuvres performed on any of the free slots $Sl_i$, the free slot $Sl_i$ associated with the second avoidance manoeuvre being distinct from that associated with the first avoidance manoeuvre. More particularly, according to a strategy with two or more avoidance manoeuvres, and it is possible, according to the method for adjusting the orbital path of the satellite 10, to determine a second avoidance manoeuvre to be performed on a free slot $Sl_i$ prior in time to the free slot $Sl_i$ of the first manoeuvre. In other words, according to the method for adjusting the orbital path of the satellite 10, it is possible to determine a first avoidance manoeuvre to be performed on a free slot $Sl_i$ later in time than the free slot of the second avoidance manoeuvre $Sl_i$, said second avoidance manoeuvre being determined later than the first manoeuvre.

To this end, in general, a first orbit $X_1(t)$ from a first avoidance manoeuvre $\Delta Vmax.\vec{d}_1$ relating to the reference orbit $X_{ref}$, determined on any of the free slots $Sl_i$, serving as a new reference orbit relative to a second avoidance manoeuvre $\Delta V.\vec{d}_2$, should be able to be evaluated also for the free slot or slots $Sl_i$ prior to said any of the free slots $Sl_i$ associated with the first manoeuvre. To this end, and in general, the first avoidance orbit $X_1(t\_Sl_i<t)$ at all manoeuvre time instants $t\_Sl_i$ relating to the free slots prior to the first avoidance manoeuvre $\Delta Vmax.\vec{d}_1$ orbit is determined by interpolation of the ephemerides related to the reference orbit $X_{ref}$.

To this end, it will be necessary for the method for adjusting the orbital path of a satellite 10 to command the avoidance manoeuvres to the satellite 10 not in the order of determination of the avoidance manoeuvres, but according to a time sequential execution of manoeuvres according to the time location of free slots $Sl_i$ associated with the determined collision avoidance manoeuvres.

Figure 9:
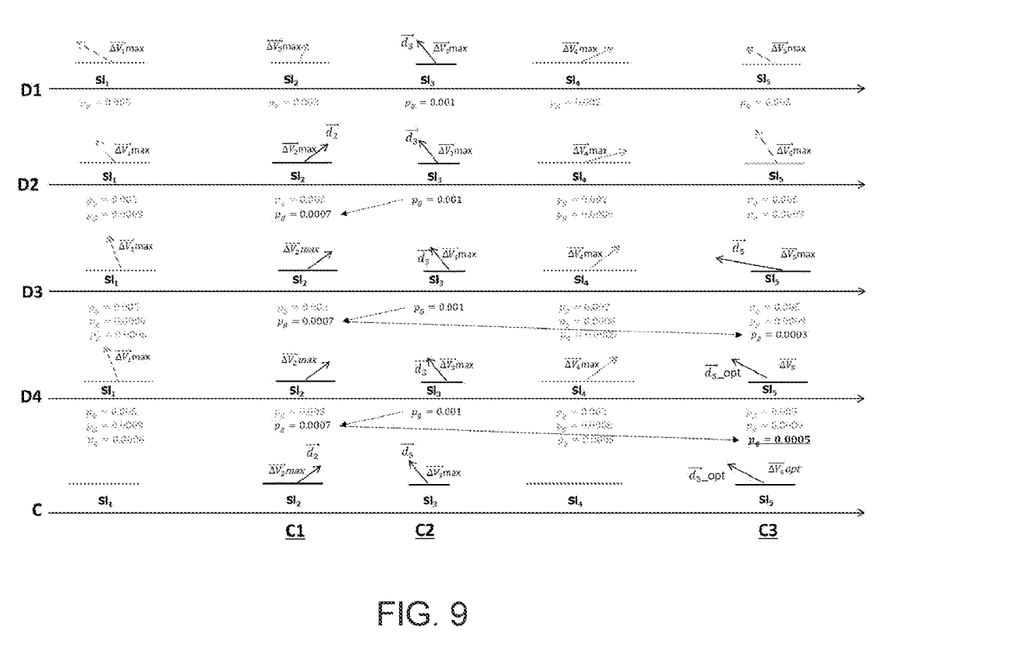
FIG. 9 is a schematic time representation of an example of multiple orbital manoeuvres of the satellite to obtain an overall probability of collision less than a critical threshold of collision.

According to FIG. 9, a non-limiting example of the application of a strategy for determining free slots $Sl_1$, $Sl_i$ and avoidance manoeuvres required to avoid a collision of the satellite 10 with the cloud of debris $d_1$, $d_i$ is represented. To this end, a hypothesis is made that 5 free manoeuvre slots $Sl_1$, $Sl_2$, $Sl_3$, $Sl_4$, $Sl_5$ are available in order to be able to carry out the avoidance manoeuvres in such a way as to obtain an overall probability $P_g$ of collision less than or equal to the critical threshold $P_{th}$ of collision. As a non-limiting example, the critical threshold of collision $P_{th}$ is set to $P_{th}=0.0005$.

According to FIG. 9, three lines representative of three determinations D1, D2, D3 of three avoidance manoeuvres required for collision avoidance between the satellite 10 and the cloud of debris $d_1$, $d_i$ are represented. A fourth determination line D4 represents the optimisation of the parameters of the third manoeuvre, that is, the velocity variation $\Delta V$ and the direction $\vec{d}$ of the thrust so as to obtain an overall probability $P_g$ of collision equal to the critical threshold $P_{th}$ of collision, equal to $P_{th}=0.0005$.

The first determination D1 consists in determining a first avoidance manoeuvre $\Delta V.\vec{d}$ on any of the five free manoeuvre slots $Sl_1$, $Sl_2$, $Sl_3$, $Sl_4$, $Sl_5$ enabling a first lowest overall probability to be obtained. To this end, in a manner similar to that described through FIG. 7, a plurality of manoeuvres on each free slot, each along a plurality of directions related to the manoeuvre thrust and according to a maximum velocity variation $\Delta V$ related to each free manoeuvre slot $Sl_1$, $Sl_2$, $Sl_3$, $Sl_4$, $Sl_5$ is evaluated. According to this first determination D1, the first manoeuvre to obtain the first lowest overall probability $P_{g1}$ of collision is one of the manoeuvres evaluated on the third free slot $Sl_3$, along a first direction $\vec{d}_3$ and according to the maximum velocity variation $\Delta V3max$ allowed during the third free slot $Sl_3$. As a non-limiting example, the first overall probability $P_{g1}$ of collision obtained has a value equal to $P_{g1}=0.001$. As this value of first overall probability $P_{g1}$ following the first avoidance manoeuvre $\Delta V3max.\vec{d}_3=\overrightarrow{\Delta V3max}$ is not less than or equal to the critical threshold of $P_{th}$ of collision, a second collision avoidance manoeuvre has to be determined.

According to FIG. 9, the second determination D2 consists in determining a second avoidance manoeuvre $\Delta V.\vec{d}$ on any of the four free manoeuvre slots $Sl_1$, $Sl_2$, $Sl_4$, $Sl_5$ distinct from the third slot already determined for the first avoidance manoeuvre $\overrightarrow{\Delta V3max}$ enabling a second lowest overall probability $P_{g2}$ to be obtained, by taking account of the effect of the first manoeuvre $\overrightarrow{\Delta V3max}$. To this end, in a manner similar to that described through FIG. 8, a plurality of avoidance manoeuvres on each of the four free manoeuvre slots $Sl_1$, $Sl_2$, $Sl_4$, $Sl_5$ remaining available, is evaluated along a plurality of directions related to the manoeuvre thrust and according to a maximum velocity variation $\Delta V$ related to each free manoeuvre slot $Sl_1$, $Sl_2$, $Sl_4$, $Sl_5$ remaining. According to this second determination D2, the second avoidance manoeuvre enabling the second lowest overall probability $P_{g2}$ of collision to be obtained is one of the avoidance manoeuvres evaluated on the second free slot $Sl_2$, along a second direction $\vec{d}2$ and according to the maximum velocity variation $\Delta V2max$ allowed during the second free slot $Sl_2$. As a non-limiting example, the second overall probability $P_{g2}$ of collision obtained has a value equal to $P_{g2}=0.0007$. As this value of second overall probability $P_{g2}$ following the combination of the first manoeuvre $\overrightarrow{\Delta V3max}$ and the second avoidance manoeuvre $\overrightarrow{\Delta V2}$max is not less than or equal to the critical threshold of collision $P_{th}$, a third collision avoidance manoeuvre has to be determined.

According to FIG. 9, the third determination D3 consists in determining a third avoidance manoeuvre $\Delta V.\vec{d}$ on any of the three free manoeuvre slots $Sl_1$, $Sl_4$, $Sl_5$ still available, enabling a third lowest overall probability $P_{g3}$ to be obtained by taking account of the combined effect of the first avoidance manoeuvre $\overrightarrow{\Delta V3}$max and the second avoidance manoeuvre $\overrightarrow{\Delta V2}$max. To this end, in a manner similar to that described through FIG. 8, a plurality of avoidance manoeuvres on each of the three free manoeuvre slots $Sl_1$, $Sl_4$, $Sl_5$ remaining available, is evaluated along a plurality of directions related to the thrust of the avoidance manoeuvre and according to a maximum velocity variation $\Delta V$ related to each free manoeuvre slot $Sl_1$, $Sl_4$, $Sl_5$ remaining. According to this third determination D3, the third avoidance manoeuvre enabling the lowest third overall probability $P_{g3}$ of collision to be obtained is one of the manoeuvres evaluated on the fifth free slot $Sl_5$, along a fifth direction $\vec{d}5$ and according to a maximum velocity variation $\Delta V5$max allowed during the fifth free slot $Sl_5$. As a non-limiting example, the third overall probability $P_{g3}$ of collision obtained has a value equal to $P_{g2}$=0.0003, that is, a value below the critical threshold of $P_{th}$ of collision.

According to FIG. 9, a fourth determination D4 consists in adjusting the parameters of the third manoeuvre so as to obtain a third overall probability $P_{g3}$ of collision equal to the critical threshold of $P_{th}$ of collision, namely $P_{th}$=0.0005. In this respect, a velocity variation value $\Delta V5_{opt}$ less than the maximum velocity variation $\Delta V5$max allowed, and combined with a fifth direction $\vec{d}5\_opt$ optimised with respect to the optimal velocity variation $\Delta V5_{opt}$ is obtained.

According to FIG. 9, a collision avoidance command C of the satellite 10 with all the debris $d_1$, $d_i$ of the cloud comprises the combination of the three determined avoidance manoeuvres $\overrightarrow{\Delta V3}$max, $\overrightarrow{\Delta V2}$max, $\overrightarrow{\Delta V5}_{opt}$ performed according to a time order related to the three free slots associated with said three manoeuvre. In other words, the collision avoidance command C includes a first command C1 comprising the execution during the second free slot $Sl_2$ of the second determined avoidance manoeuvre $\overrightarrow{\Delta V2}$max, then the collision avoidance command C includes a second command C2 comprising the execution during the third free slot Sl3 of the first determined avoidance manoeuvre $\overrightarrow{\Delta V3}$max, and finally, the collision avoidance command C includes a third command C3 comprising the execution during the fifth free slot $Sl_5$ of the third determined avoidance manoeuvre $\overrightarrow{\Delta V5}_{opt}$.

Optionally, and according to the invention, in order to confirm the result obtained, namely the determination of manoeuvres of the satellite enabling collision avoidance between the satellite and all the debris of the cloud, preferably a numerical calculation of the path of the satellite 10 including all the identified manoeuvres can be performed.

Indeed, the propagation used to evaluate the avoidance manoeuvres on the overall probability $P_g$ of collision, called fast propagation based on the ephemeris of the state transition matrix $\phi(t, t_0)$ and on the ephemeris of the reference orbit $X_{ref}$ of satellite 10, is a simplified propagation. As a result, the overall probability $P_g$ of collision may be slightly different from an overall probability of collision determined according to numerical orbit propagation determinations, for example and in a non-limiting manner, from the orbital parameters of satellite 10. To ensure that this overall probability $P_g$ of collision is close to the critical probability threshold of collision $P_{th}$, a numerical propagation taking account of the previously estimated manoeuvres should be performed and the overall probability of collision recalculated.

If, however, the operation of calculating the overall probability $P_g$ of collision based on a numerical propagation of the orbit of the satellite 10, especially comprising the avoidance manoeuvres determined previously, results in an overall probability $P_g$ of collision greater than the critical probability threshold $P_{th}$ of collision, it would be necessary, according to the invention, to resume the determination of additional avoidance manoeuvres according to the method for adjusting the orbital path of the satellite 10 described in FIGS. 7 and 8, from a new reference orbit relating to the orbit of the satellite determined numerically.

A simpler solution than that based on a verification of the calculation of the overall probability $P_g$ of collision by a numerical calculation of the propagation of the orbit of the satellite corrected according to the avoidance manoeuvres determined previously, simply consists in setting a sufficiently low critical probability threshold of collision $P_{th}$ in order to compensate for the uncertainties of the so-called fast propagation solution.

Figure 10:
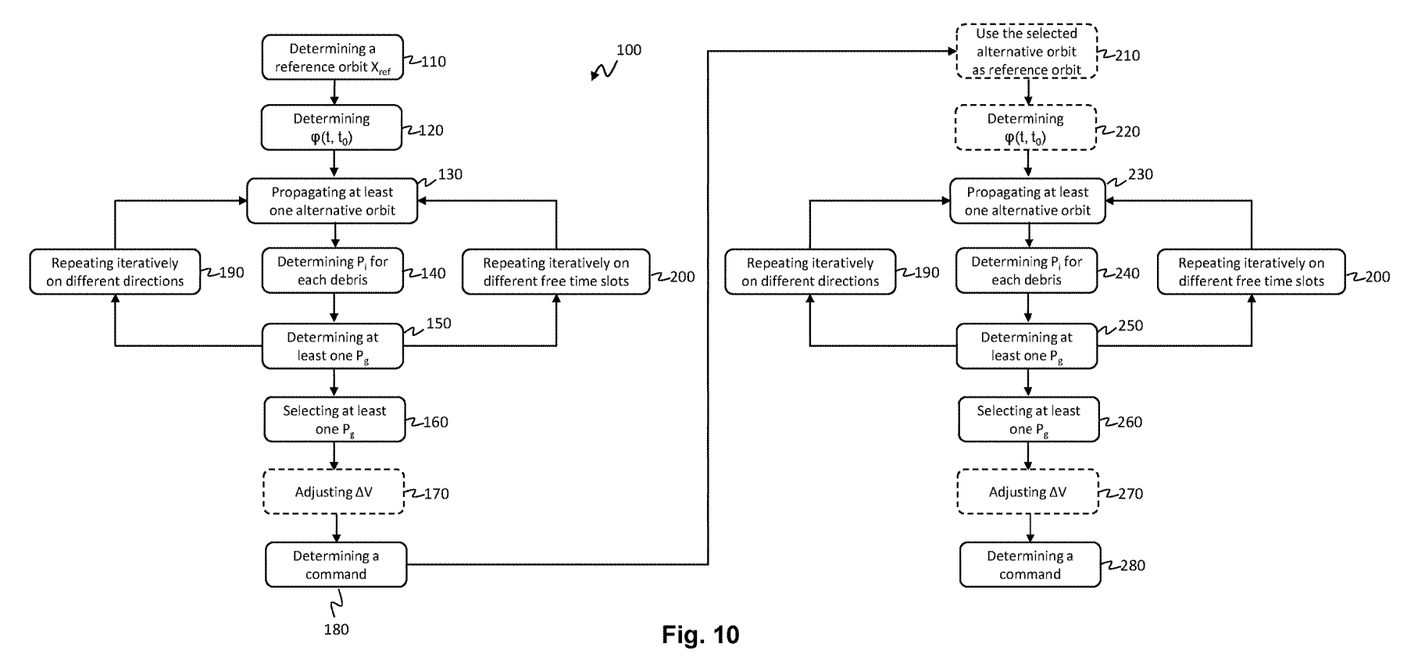
FIG. 10 is a representation of an example flowchart of the method for adjusting the orbital path of the satellite.

According to FIG. 10, a non-limiting example of a flowchart relating to the method 100 for adjusting the orbital path of the satellite 10 comprises several steps.

The first step consists in determining 110 a reference path of the orbit $X_{ref}$ of the satellite 10 from an initial time instant $t_0$ until the date of closest passage $TCA_1$, $TCA_i$ furthest from the initial time instant $t_0$. Preferably, according to the invention, the determination 110 of the reference path of the orbit $X_{ref}$ of the satellite 10 is determined according to a free drift propagation of the orbit $X_{ref}$ of the satellite 10.

The first step is associated with a second step relating to the determination 120 of an ephemeris of a state transition matrix $\phi(t, t_0)$ representative of the reference path of the orbit $X_{ref}$ of the satellite 10. This first step is essential to the invention. It makes it possible especially to calculate all the state transition matrices $\phi(t_n, tm)$ required for the method for adjusting the orbital path of the satellite.

The determined state transition matrix $\phi(t, t_0)$ enables a step 130 of propagating at least one first alternative orbit $X_{1i}$ of the reference orbit $X_{ref}$ of the satellite 10 according to at least one first avoidance manoeuvre $\Delta V.\vec{d}$ related to the satellite 10 performed during at least one free manoeuvre time slot $Sl_1$, and from at least one manoeuvre time instant $t\_Sl_1$ of the at least one free manoeuvre time slot $Sl_1$ until the date of closest passage $TCA_i$ furthest from the initial time instant $t_0$.

The propagation of the at least one first alternative orbit $X_{1i}$ of the satellite 10 enables a step of analytically determining 140 an individual probability $P_i$ of collision on each date of closest passage $TCA_1$, $TCA_i$ for each piece of debris $d_1$, $d_i$ related to at least the first alternative orbit $X_{1i}$ of the satellite 10.

The method 100 for adjusting the orbital path of the satellite 10, in accordance with the description in FIG. 3, comprises a step of determining 150 at least one overall probability $P_g$ of collision according to all the individual probabilities $P_i$ of collision determined according to the at least one first alternative orbit $X_{1i}$ of the satellite 10 related to the at least one first avoidance manoeuvre $\Delta V.\vec{d}$. This step of determining 150 at least one overall probability $P_g$ of collision is followed by a step of selecting 160 at least one first lowest overall probability $P_g$ of collision from the at least one determined overall probability $P_g$ of collision.

Preferably, the method 100 comprises an initial step according to which each avoidance manoeuvre $\Delta V.\vec{d}$ comprises an initial value of maximum velocity variation $\Delta V_{max}$ allowed during the avoidance manoeuvre $\Delta V.\vec{d}$. The method 100 preferably also comprises a step of adjusting 170 the velocity variation $\Delta V$ of the at least one first avoidance manoeuvre $\Delta V.\vec{d}$ when the selected at least first lowest overall probability $P_g$ is less than a critical probability threshold $P_{th}$ of collision, so as to obtain at least one first overall probability $P_g$ of collision as close as possible to or equal to the critical probability threshold $P_{th}$ of collision. The adjustment of the velocity variation $\Delta V$ may also be associated with an adjustment of the direction $\vec{d}$ of the manoeuvre.

The method also includes a step of determining 180 a command C of the satellite 10 including at least the first manoeuvre related to the first lowest overall probability $P_g$ of collision selected so as to best minimise the risk of collision of the satellite 10 with the cloud of debris.

Preferably, the step of propagating 130 alternative orbits is repeated several satellite times by a step of multiple iterations 190 on the direction $\vec{d}$ of the avoidance manoeuvre $\Delta V.\vec{d}$ so as to obtain a first plurality of alternative orbits $X_{1i}$ related to a first plurality of avoidance manoeuvres $\Delta V.\vec{d}$ and to evaluate a first plurality of overall probabilities of collision $P_g$ related to each of the alternative orbits related to the first plurality of avoidance manoeuvres $\Delta V.\vec{d}$.

Preferably, the step of propagating 130 alternative orbits is also repeated several times by a step of multiple iterations 200 according to a plurality of free manoeuvre slots $Sl_1$, $Sl_i$ of the satellite 10 so as to obtain a second plurality of alternative orbits $X_{1i}$ and to evaluate a second plurality of overall probabilities $P_g$ of collisions related to the second plurality of alternative orbits $X_{1i}$.

According to FIG. 10, the step of determining 180 a command C of the satellite 10 may comprise a plurality of additional steps 230, 240, 250, 260, 270, 290, and 300 similar to the steps preceding the step of determining 180 a command C, for defining a step of determining 280 the command C of the satellite 10 for which at least one second avoidance manoeuvre combined with the first manoeuvre related to the first lowest overall probability $P_g$ of collision is also determined. The at least one second manoeuvre is the second manoeuvre related to a second lowest probability of collision determined according to the steps 230, 240, 250, 260, 270, 290, and 300 of the method.

According to FIG. 10, the step of determining 280 the command C of the satellite 10 for which at least one second avoidance manoeuvre combined with the first manoeuvre related to the first lowest overall probability $P_g$ of collision is also determined, may include the steps 210, 220 of the method for which the reference path of the satellite 10 is the path of the first alternative orbit $X_{1i}$ of the satellite 10 related to the first lowest overall probability $P_g$ of collision. The path of the first alternative orbit $X_{1i}$ of satellite 10 could be numerically re-evaluated taking account of the first avoidance manoeuvre. The path of the first alternative orbit $X_{1i}$ of satellite 10 will serve as a new reference path, and enable the generation of new ephemerides of the state transition matrix $\phi(t, t_0)$.

Figure 11:
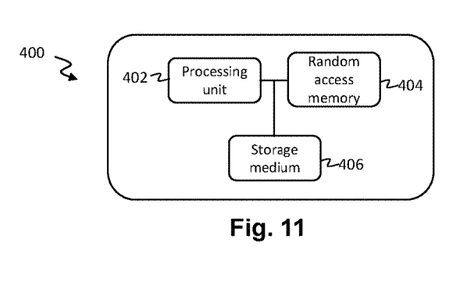
FIG. 11 is a schematic representation of a device for implementing the method for adjusting the orbital path of the satellite.

According to FIG. 11, a device 400 for implementing the method for adjusting the orbital path of the satellite 10 may comprise an information processing unit 402 of the processor type such as, for example and in a non-limiting manner, a processor specialised in signal processing, or a microcontroller, or any other type of circuit enabling software-type instructions to be executed. The device 400 also includes random access memory 404 associated with the information processing unit 402. The information processing unit 402 is configured to execute a program, also called a computer program, comprising instructions implementing the method 100 for adjusting the orbital path of a satellite 10 described above. The instructions are loaded into the random access memory of the device 400 from any type of storage media 406 such as, for example and in a non-limiting manner, a non-volatile type memory or an external memory such as a removable storage memory card. The instructions may also be loaded via a connection to a communications network.

Alternatively, the computer program, comprising instructions implementing the method 100 for adjusting the orbital path of the satellite 10, may also be implemented in hardware form by a machine or by an application-specific integrated circuit or by a programmable logic array type electronic circuit.

It should be understood that the detailed description of the subject matter of the invention, which is given for illustrative purposes only, does not in any way constitute a limitation, as the technical equivalents are also comprised in the scope of the present invention.

The invention claimed is:

1. An adjustment method for adjusting an orbit of a satellite to limit a risk of collision with a cloud of space debris, wherein each piece of debris is associated to a date of closest passage with the satellite, the adjustment method including the steps of:
   (a) determining a reference orbit of the satellite from an initial time instant until the date of closest passage furthest from the initial time instant;
   (b) determining an ephemeris of state transition data representative of the reference orbit of the satellite;
   (c) propagating, according to the determined ephemeris of the state transition data, at least one first alternative orbit of the reference orbit of the satellite according to at least one first avoidance maneuver related to the satellite performed during at least one free maneuver time slot, and from at least one maneuver time instant of the at least one free maneuver time slot until the date of closest passage furthest from the initial time instant;
   (d) analytically determining an individual probability of collision on each date of closest passage for each piece of debris according to the at least one first alternative orbit of the satellite;
   (e) determining at least one overall probability of collision according to all the individual probabilities of collision determined according to the at least one first alternative orbit of the satellite related to the at least one first avoidance maneuver;
   (f) selecting at least one first lowest overall probability of collision among the at least one overall probability obtained according to step (e);
   (h) determining a command of the satellite including at least the first maneuver related to the selected first lowest overall probability of collision.

2. The adjustment method according to claim 1, wherein determining the reference orbit of the satellite is determined according to a free drift propagation of the orbit of the satellite.

3. The adjustment method according to claim 1, wherein the steps (c), (d) and (e) are iteratively repeated along a plurality of directions of the at least one first avoidance maneuver so as to obtain a first plurality of alternative orbits related to a first plurality of avoidance maneuvers and to evaluate a first plurality of overall probabilities of collision related to each of the alternative orbits related to the first plurality of avoidance maneuvers.

4. The adjustment method according to claim 1, wherein the at least one first avoidance maneuver comprises an initial value of maximum velocity variation allowed during the at least one first avoidance maneuver.

5. The adjustment method according to claim 1, further comprising a step (g), preceding step (h), comprising an adjustment of a velocity variation of the at least one first avoidance maneuver of the command of the satellite when the at least one first lowest overall probability selected in step (f) is less than a critical probability threshold of collision, so as to obtain at least one first overall probability of collision as close as possible to or equal to the critical probability threshold of collision.

6. The adjustment method according to claim 1, wherein the steps (c), (d) and (e) are repeated according to a plurality of free maneuver time slots of the satellite so as to obtain a second plurality of alternative orbits and to evaluate a second plurality of overall probabilities of collision related to the second plurality of alternative orbits.

7. The adjustment method according to claim 1, wherein the step (h) comprises a step of:

determining at least one second maneuver of the command of the satellite, wherein the second maneuver is combined with the first maneuver related to the first lowest overall probability of collision, the at least one second maneuver producing a second alternative orbit enabling the calculation of a second lowest probability of collision according to the steps (c) to (f) of the adjustment method.

8. The adjustment method according to claim 7, wherein determining the second maneuver of the command of the satellite, includes reiterating steps (a) and (b) of the adjustment method for a case where the reference orbit of the satellite now corresponds to the first alternative orbit of the satellite related to the first lowest overall probability of collision.

9. The adjustment method according to claim 1, wherein the ephemeris of state transition data is an ephemeris of state transition matrix.

10. A non-transitory information storage medium storing a computer program comprising instructions for implementing, by a processor, the adjustment method according to claim 1, when the program is read and executed by the processor.

* * * * *